US012330859B2

(12) United States Patent
Zembrod

(10) Patent No.: US 12,330,859 B2
(45) Date of Patent: Jun. 17, 2025

(54) VALVE CARTRIDGE FOR ACTUATORS OF A RANGE OF PACKAGING

(71) Applicant: Eric Zembrod, Sao Paulo (BR)

(72) Inventor: Eric Zembrod, Sao Paulo (BR)

( * ) Notice: Subject to any disclaimer, the term of this patent is extended or adjusted under 35 U.S.C. 154(b) by 239 days.

(21) Appl. No.: 17/919,449

(22) PCT Filed: Apr. 15, 2020

(86) PCT No.: PCT/BR2020/050129
§ 371 (c)(1),
(2) Date: Oct. 17, 2022

(87) PCT Pub. No.: WO2021/207804
PCT Pub. Date: Oct. 21, 2021

(65) Prior Publication Data
US 2023/0150751 A1 May 18, 2023

(51) Int. Cl.
*B65D 83/30* (2025.01)
*B05B 1/02* (2006.01)
(Continued)

(52) U.S. Cl.
CPC ................ *B65D 83/30* (2013.01); *B05B 1/02* (2013.01); *B05B 1/30* (2013.01); *B05B 11/1059* (2023.01)

(58) Field of Classification Search
USPC .................................................... 222/402.13
See application file for complete search history.

(56) References Cited

U.S. PATENT DOCUMENTS 1,643,969 A * 10/1927 Tittemore ............. B05B 7/1218 251/285
3,380,705 A * 4/1968 Enssle ....................... B05B 9/01 251/294
(Continued)

FOREIGN PATENT DOCUMENTS

JP 2002186882 7/2002
WO WO-2019072943 A1 * 4/2019 ......... B05B 11/0067
(Continued)

OTHER PUBLICATIONS

International Search Report for PCT/BR2020/050129 dated Dec. 12, 2020.

*Primary Examiner* — Paul R Durand
*Assistant Examiner* — Michael J. Melaragno
(74) *Attorney, Agent, or Firm* — B. Aaron Schulman, Esq.; Stites & Harbison, PLLC

(57) ABSTRACT

VALVE CARTRIDGE FOR ACTUATORS OF A RANGE OF PACKAGING, having an independent complementary valve mechanism (1) to be mounted directly on the internal region of an outlet nozzle (2) of a known actuator (3) of a usual packaging (4), which actuator is traditionally combined with a pump-type mechanism (5) for extracting the product (P) contained in said packaging (4) and, accordingly, said packaging has a seal-tight upper closing part (6) that forms the body housing the extractor pump-type mechanism (5), the upper part of which is in communication with the outlet nozzle (2), while the lower part is in communication with the inside of the packaging (4), where it produces a vacuum, negative pressure or positive pressure, sufficient to move the product (P) to the outlet nozzle (2), containing an inlet duct (7) and an outlet duct (8), and in the latter there is mounted the independent complementary
(Continued)

valve mechanism (1) which alters said stream of the semi-solid product (P) turning it into a drip, trickle or spray.

11 Claims, 13 Drawing Sheets

(51) Int. Cl.
*B05B 1/30* (2006.01)
*B05B 11/10* (2023.01)

(56) References Cited

U.S. PATENT DOCUMENTS

| | | | | | |
|---|---|---|---|---|---|
| 4,166,579 | A * | 9/1979 | Beise | B05B 12/0026 | 239/526 |
| 4,273,290 | A * | 6/1981 | Quinn | B05B 1/3473 | 239/493 |
| 4,884,750 | A | 12/1989 | Werding | | |
| 5,020,727 | A * | 6/1991 | Smith | B05B 12/002 | 251/360 |
| 5,344,120 | A * | 9/1994 | Tam | B05B 1/304 | 239/DIG. 19 |
| 5,439,178 | A * | 8/1995 | Peterson | B05B 11/103 | 222/207 |
| 5,716,008 | A * | 2/1998 | Nottingham | B05B 11/1077 | 222/333 |
| 6,708,852 | B2 | 3/2004 | Blake | | |
| 7,845,521 | B2 | 12/2010 | Blake | | |
| 9,475,635 | B2 * | 10/2016 | Driskell | B65D 83/345 | |
| 10,512,928 | B2 | 12/2019 | Moretti | | |
| 10,589,303 | B2 * | 3/2020 | Johnston | B05B 9/01 | |
| 2003/0034362 | A1 | 2/2003 | Blake | | |
| 2004/0238572 | A1 | 12/2004 | Blake | | |
| 2005/0103811 | A1 * | 5/2005 | Heukamp | B65D 83/7535 | 222/402.13 |
| 2005/0230436 | A1 * | 10/2005 | Marroncles | B65D 83/753 | 222/402.13 |
| 2007/0205228 | A1 * | 9/2007 | Lin | F17C 13/04 | 222/402.13 |
| 2008/0017666 | A1 * | 1/2008 | Vanblaere | B65D 83/44 | 222/380 |
| 2009/0230156 | A1 * | 9/2009 | Prox | B65D 83/205 | 222/402.12 |
| 2016/0009479 | A1 * | 1/2016 | Driskell | B65D 83/345 | 222/402.13 |
| 2023/0150751 | A1 * | 5/2023 | Zembrod | B05B 1/30 | 222/402.13 |

FOREIGN PATENT DOCUMENTS

| | | |
|---|---|---|
| WO | WO 2019086823 | 5/2019 |
| WO | WO 2021/155449 | 8/2021 |

* cited by examiner

VALVE CARTRIDGE FOR ACTUATORS OF A RANGE OF PACKAGING

FIELD OF THE INVENTION

More specifically, the present Invention refers to a mechanism specially designed to alter the outlet stream of a semi-solid product dispensed from a usual packaging. This alteration in the stream is determined by the valve details of a cartridge which, accordingly, is defined with three embodiments, where the outlet stream of the product is altered, turning into: a drip, trickle and spray.

Therefore, the present cartridge is a complementary mechanism developed to be mounted directly on the nozzle outlet region of a known actuator of a usual packaging, which actuator is traditionally combined with an extractor pump-type mechanism of the product contained in said packaging. Thus, by pressing the actuator, said pump-type mechanism enters into action and displaces the product until same can exit through the actuator nozzle. Said condition enables a quantity of product to be dispensed each time the actuator is operated, whereupon the outlet stream is transformed.

In many circumstances, the same packaging, the same dispensing mechanism and the same actuator are utilized for different products which, for one reason or another, have to be dispensed with different streams: drip, trickle, and spray. Thus, the present cartridge is precisely designed to maintain the same constructive characteristics of the packaging and drive mechanism thereof, just by adapting the corresponding cartridge to the desired stream type.

STATE OF THE ART

Today there is an infinity of packaging specially designed so that a quantity of semi-solid product can be dispensed in a controlled manner. Said packaging is configured according to many different solutions, some simpler and others more sophisticated, but one of them stands out by utilizing a pump-type inner valve mechanism with plunger driven by an actuator which, in turn, also includes the outlet nozzle of the product, as taught, for example, by PCTBR2020050025 and U.S. Pat. No. 10,512,928, cited herein solely to exemplify the use of plunger or pump so that a certain quantity of product can be dispensed.

Therefore, the packaging of the type that has an internal mechanism for dispensing the product normally work by pressing an upper head with the appearance of an operating button. Said button is normally called "actuator", and pressing it means the pump-type mechanism starts to operate and displaces the product until same can exit through the actuator nozzle. Said condition enables a quantity of product to be dispensed every time the actuator is operated.

There is no doubt whatsoever that packaging with a pump-type mechanism is sufficient for a product to be dispensed correctly and in the desired quantity. However, said pump-type mechanisms generally have specific details to meet the particular fluidity characteristics for each product to be dispensed, because, for one reason or another, said products have to be dispensed with different streams, not only because of their viscosity, but also due to other factors. Among the most well-known streams, it is possible to define them as follows: drip, trickle, and spray. Consequently, a greater variety of pump-type mechanisms is required to meet the particular fluidity characteristics of each product to be dispensed.

Moreover, conventional packaging of said nature presents other disadvantages, in which the most significant is that the outlet nozzle remains open and, consequently, is a target for the effects caused by the outside environment, chiefly the entry of air. More precisely, it can be said that between the outlet nozzle and the extractor pump-type mechanism of the product there is absolutely no barrier for preventing the entry of air. This situation allows air from the outside environment to contaminate the product remaining between the nozzle and the extractor mechanism, also causing oxidation thereof and, to avoid this, a larger quantity of preservatives is generally used.

Therefore, the deterioration of the product remaining between the nozzle and the extractor mechanism is caused by the fact that there is no valve component at the end of the product outlet, namely the nozzle and, accordingly, from this point up to the seal-tight valve of the extractor mechanism, all the remaining product is a target for contamination by the outside air and, consequently, in many cases, said remaining part of the product can "represent a dose to be dispensed", which generates a vicious cycle in the deterioration of the product dispensed, as some part will always remain in the actuator region. Obviously deterioration is understood to be the different effects caused by the entry of air into the nozzle region, which may cause significant alterations to the product, such as: contamination by micro-organisms, dryness, oxidation, run-off and others.

OBJECTIVES OF THE INVENTION

An objective to be achieved with the present cartridge is the idealization of a complementary mechanism developed to be mounted directly onto the nozzle outlet region of any known actuator of a usual packaging, where the working thereof makes it possible to alter the outlet stream of the semi-solid product dispensed. This alteration in the stream is determined by the valve details of the cartridge which, accordingly, is defined with three embodiments, where the outlet stream of the product is altered, turning into: drip, trickle, and spray.

Another objective of the invention is to provide valve means for seal-tight closing of the outlet nozzle of the product, logically to prevent the entry of outside air and to eliminate those disadvantages of usual packaging, that is, to provide a seal-tight valve closing precisely at the end of the product outlet, and to fully eliminate the entry of air and any remaining part of the product which could potentially come into contact with the outside air. Consequently, there is no deterioration of the product caused by the entry of air into the nozzle region, thus eliminating those significant alterations of the product, such as: contamination by micro-organisms, drying, oxidation, run-off and others.

Another objective of the invention is a cartridge that can work in any known actuator and traditionally combined with an extractor pump-type mechanism of the product contained in said packaging. Thus, when the actuator is pressed, said pump-type mechanism begins operating and displaces the product until same can exit through the actuator nozzle. This condition enables a quantity of product to be dispensed every time the actuator is pressed, where that transformation of the outlet stream occurs.

Another objective of the invention is to enable the same packaging, the same dispensing mechanism and the same actuator to be utilized for different semi-solid products which, for one reason or another, have to be dispensed with different streams: drip, trickle, and spray. Thus, the present cartridge is precisely designed to maintain the same constructive characteristics of the packaging and of the drive mechanism thereof, adapting just the cartridge corresponding to the type of which is desirable to obtain for the semi-solid product to be dispensed.

Another objective of the invention is to enable the same packaging that was used to dispense a substantially larger range of products in different states of aggregation, notably liquids, oils and creams and semi-solids in general, such as occurs with various cosmetics, be they for beauty, for therapeutic purposes or both, some also known as cosmeceutics having action comparable to medicines.

It is also an objective of the invention to enable the same cartridge assembly to be utilized in packaging of the "press, without pump-type mechanism" type, that is, upon pressing the body of the packaging, sufficient internal pressure is created to drive the cartridge, such that a quantity of product contained in the packaging can be dispensed in the same way.

DESCRIPTION OF THE DRAWINGS

Below is a detailed description of the present Invention for improved understanding, drawing references to the accompanying drawings.

DETAILED DESCRIPTION OF THE INVENTION

Figure 1:
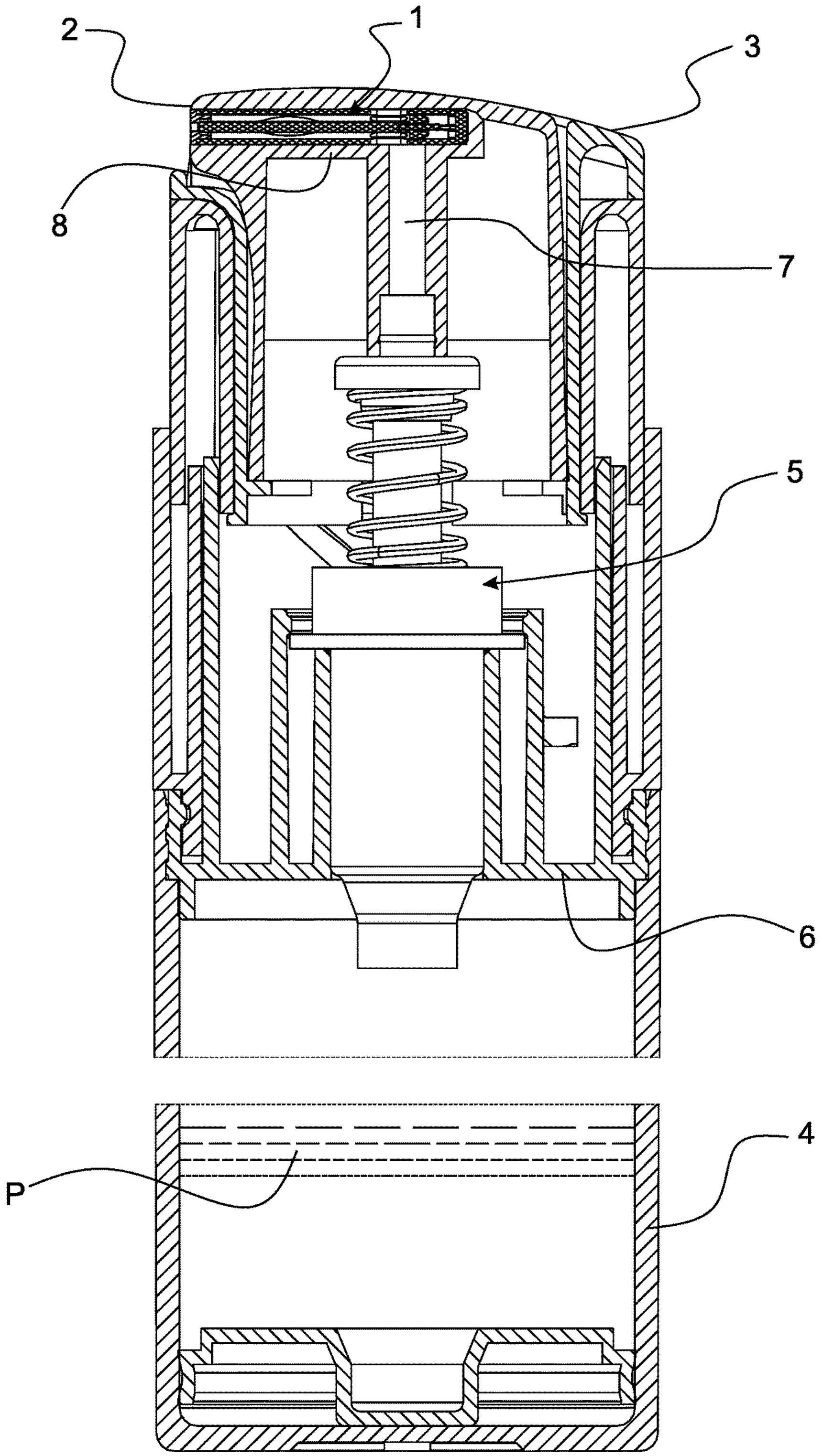
FIG. 1 represents a cross section view exemplifying a packaging with actuator and dispenser mechanism, where the actuator includes the present valve cartridge.

According to these illustrations and details herein, more particularly FIG. 1, the present Invention, a VALVE CARTRIDGE FOR ACTUATORS OF A RANGE OF PACKAGING, is characterized by being an independent complementary valve mechanism (1) developed to be mounted directly on the internal region of the outlet nozzle (2) of a known actuator (3) of a usual packaging (4), which actuator is traditionally combined with a pump-type mechanism (5) for extracting the product (P) contained in said packaging (4) and, accordingly, said packaging has a seal-tight upper closing part (6) that forms the body housing the extractor pump-type mechanism (5), the upper part of which is in communication with the outlet nozzle (2), while the lower part is in communication with the inside of the packaging (4), where it produces a vacuum, negative pressure or positive pressure, sufficient to move the product (P) to the outlet nozzle (2), containing an inlet duct (7) and an outlet duct (8), and in the latter there is mounted the independent complementary valve mechanism (1) which alters said stream of the semi-solid product (P) turning it into a drip, trickle or spray.

Figure 2:
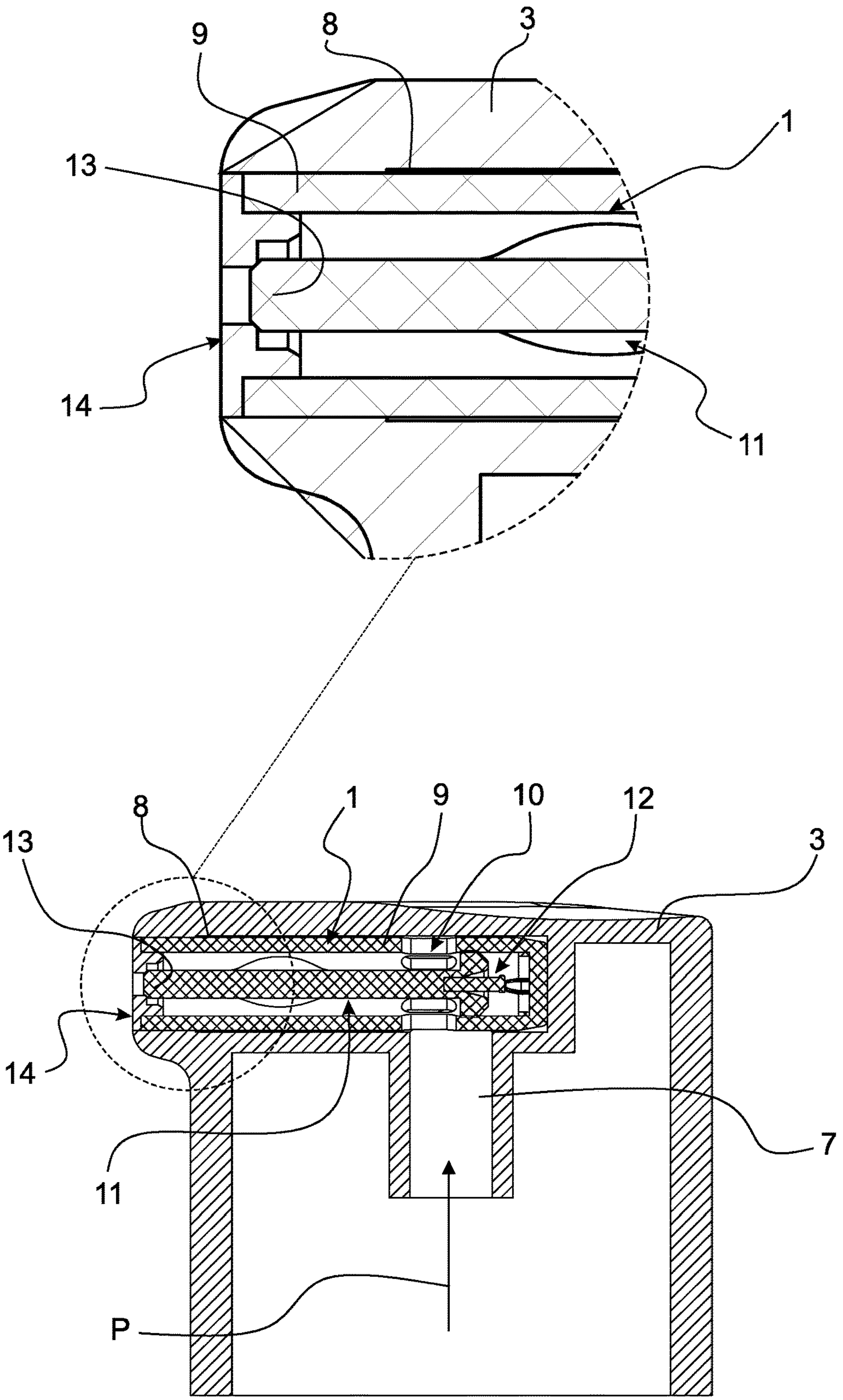
FIG. 2 shows enlarged details of the front view.

As illustrated in FIG. 2, the independent complementary valve mechanism (1) is formed by a tubular cartridge (9) with diameter and length consistent to be housed inside the outlet duct (8) of the actuator (3), where said cartridge has means (10) so that its internal part communicates with the inlet duct (7) and receives the stream of product (P) to be altered and dispensed and, accordingly, inside said cartridge a mobile part is longitudinally housed in jet form (11) and respective spring (12), said jet having a rear end supported on the tubular cartridge (9) itself, while the opposite end is an obturator tip (13) normally kept pressed against a seat seal (14) coupled to the front end of said cartridge (9) and of the outlet nozzle (2), and, further, said jet (11) or obturator tip (13) moves away from said seat seal (14) only when there is an increase in internal pressure in the ducts (7-8) and, simultaneously, a product stream (P) also occurs inside the inlet duct (7) and in the outlet duct (8), consequently, a portion in drip form of said product (P) is dispensed in the outlet nozzle (2).

Figure 3:
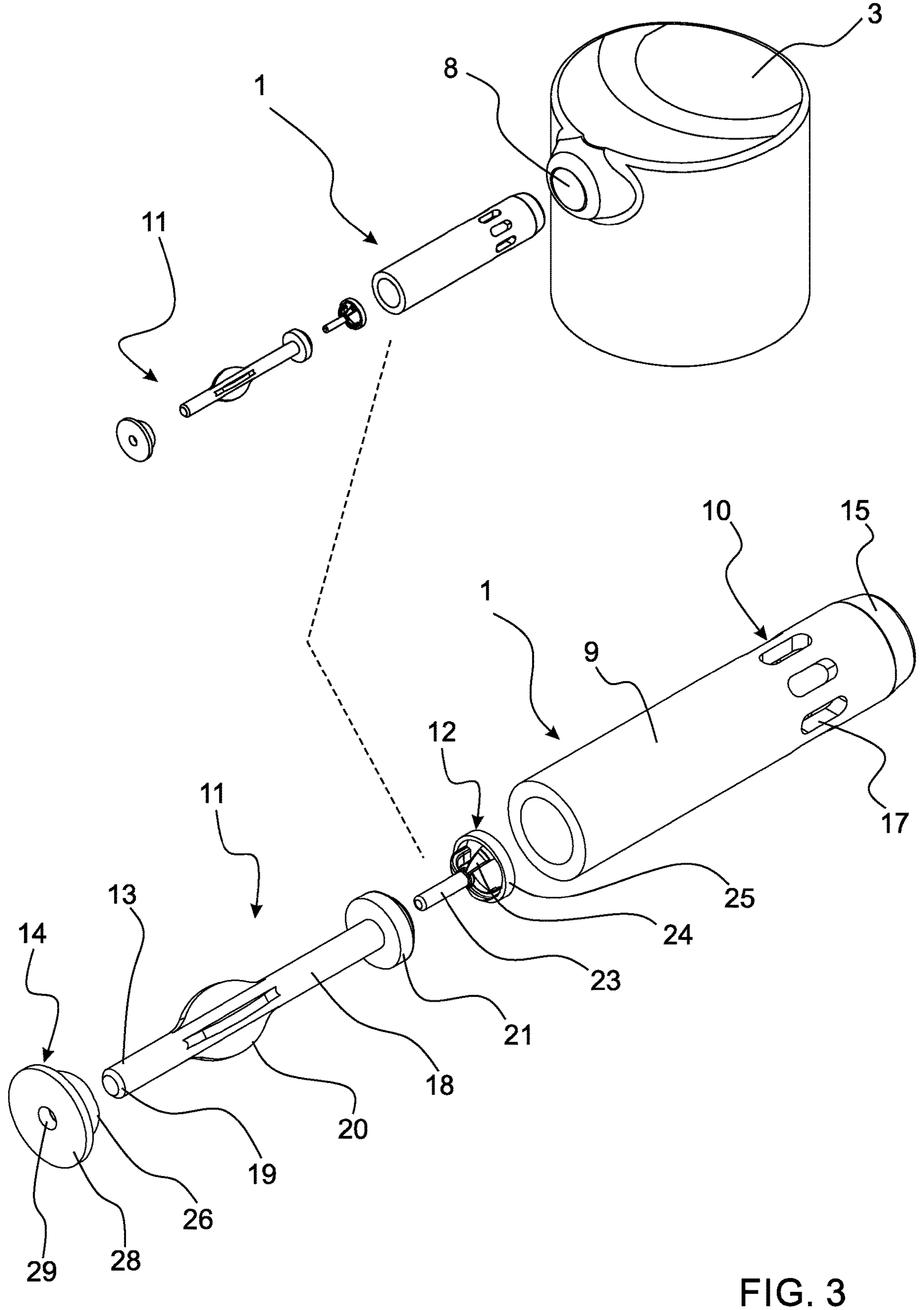
FIG. 3 illustrates a blown-up view and an enlarged detail thereof, showing in a front angle the actuator and the components that form the present valve cartridge.
Figure 4:
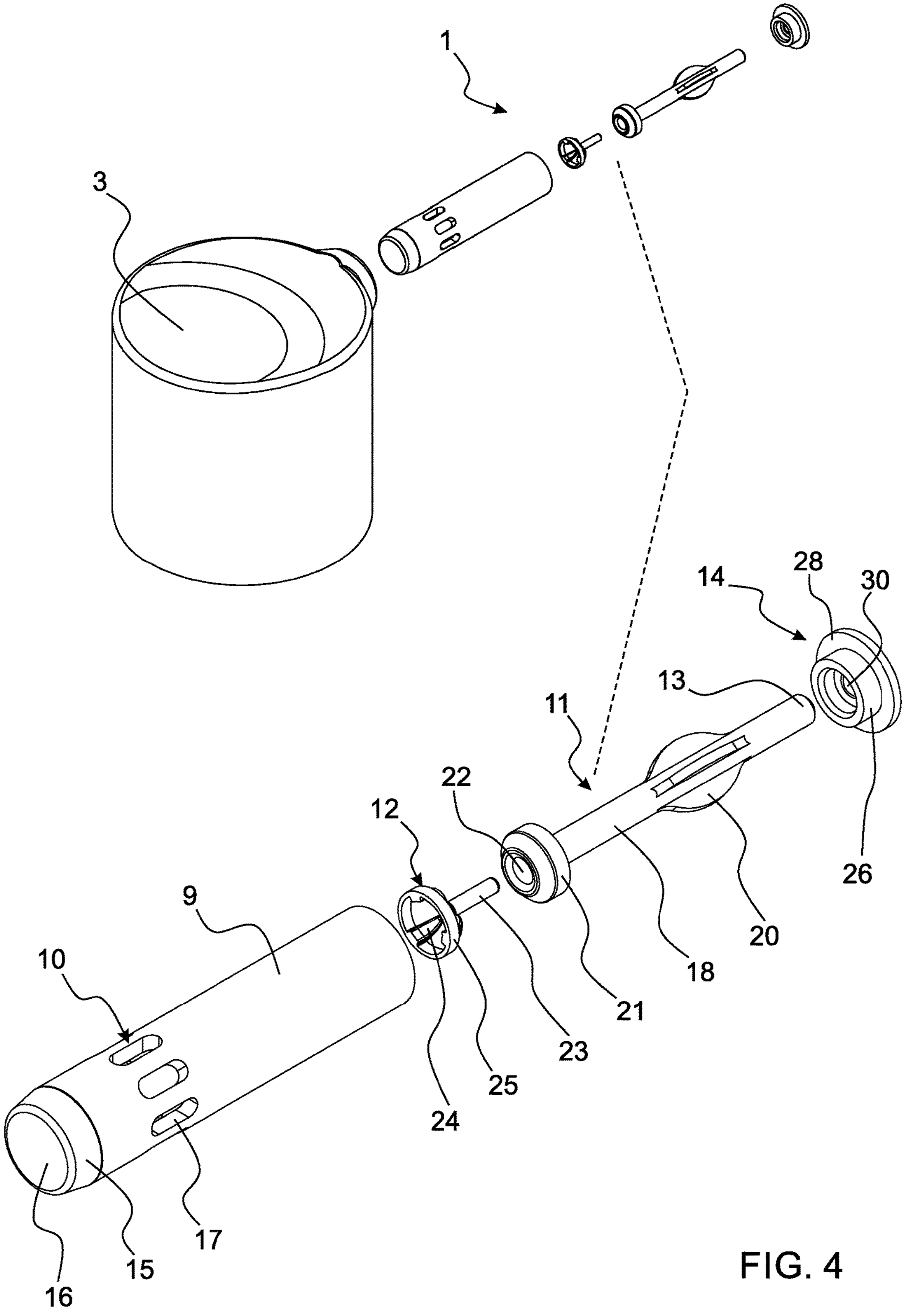
FIG. 4 is also a blown-up view and an enlarged detail thereof, but showing in a rear angle the actuator and the components that form the present valve cartridge.
Figure 5:
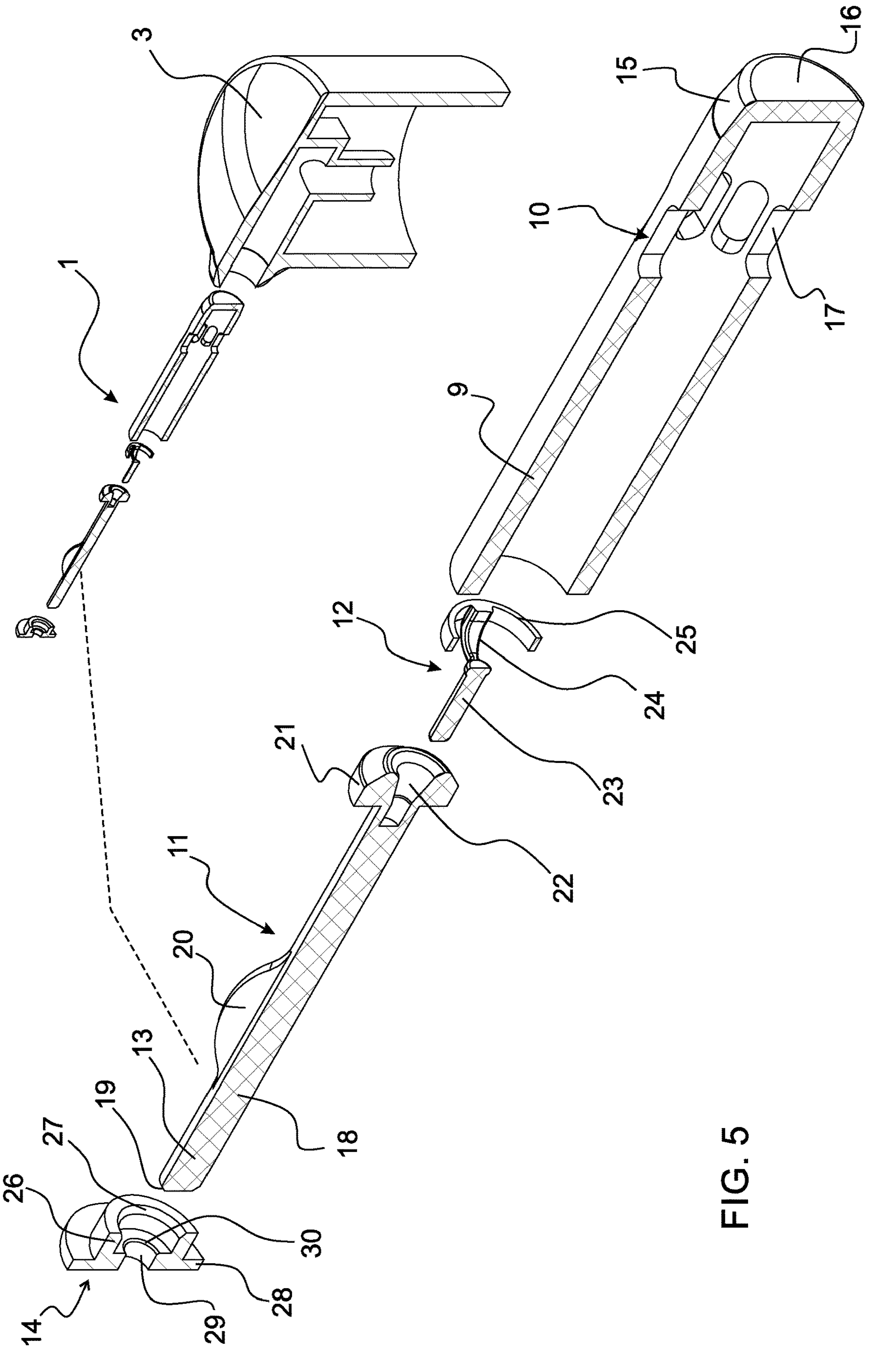
FIG. 5 shows a view practically identical to FIG. 3, but in cross section showing the internal details of the assembly.

In relation to FIGS. 3, 4 and 5, the tubular cartridge (9) presents a frustoconical rear end (15) which makes it easier to fit inside the outlet duct (8) and, further, the rear end includes a closing (16) which, internally, constitutes support for the spring (12), and before said frustoconical tapering (15) the communicating means (10) with the inlet duct (7) are defined by a string of oblong apertures (17).

The jet (11) has an elongated part in the form of cylindrical rod (18), having a front end with a chamfer (19) and averagely has radial vanes (20) and at the rear end includes a plunger-like head (21), with a central hole (22) for incasing the spring (12), and the plunger-like head (21) and the radial vanes (20) have outer diameters consistent for tight and sliding inside the tubular cartridge (9).

The spring (12) is comprised of a cylindrical pin (23) which, by the front end, is incased into that central hole (22) of the plunger (21), while at the opposite end it has radial projections curved backwards that configure small blade springs (24), whose distal ends are interconnected by a stabilizer ring (25) which, in turn, constitutes support against the closing (16) of the tubular cartridge (9) and, thus, when there is an increase in pressure inside said tubular cartridge (9), the plunger (21) is forced backwards and overcomes the pressure of the spring blades (24), consequently, the chamfered end (19) of the jet (11) moves away from the seat seal (14) allowing a reduced quantity of product (P), in drip form, to be dispensed.

The seat seal (14) is formed by a rear ring part (26), with internal chamfer (27) and external diameter consistent for penetrating and being locked inside the tubular cartridge (9), having a front flange (28) as penetration limit, with external diameter equal to that of the tubular cartridge (9) and, further, this flange is hollowed by a central hole (29)

internally with a chamfer (30) which, in turn, constitutes the seat seal per se for the obturator tip (13) of the jet (11).

Figure 6:
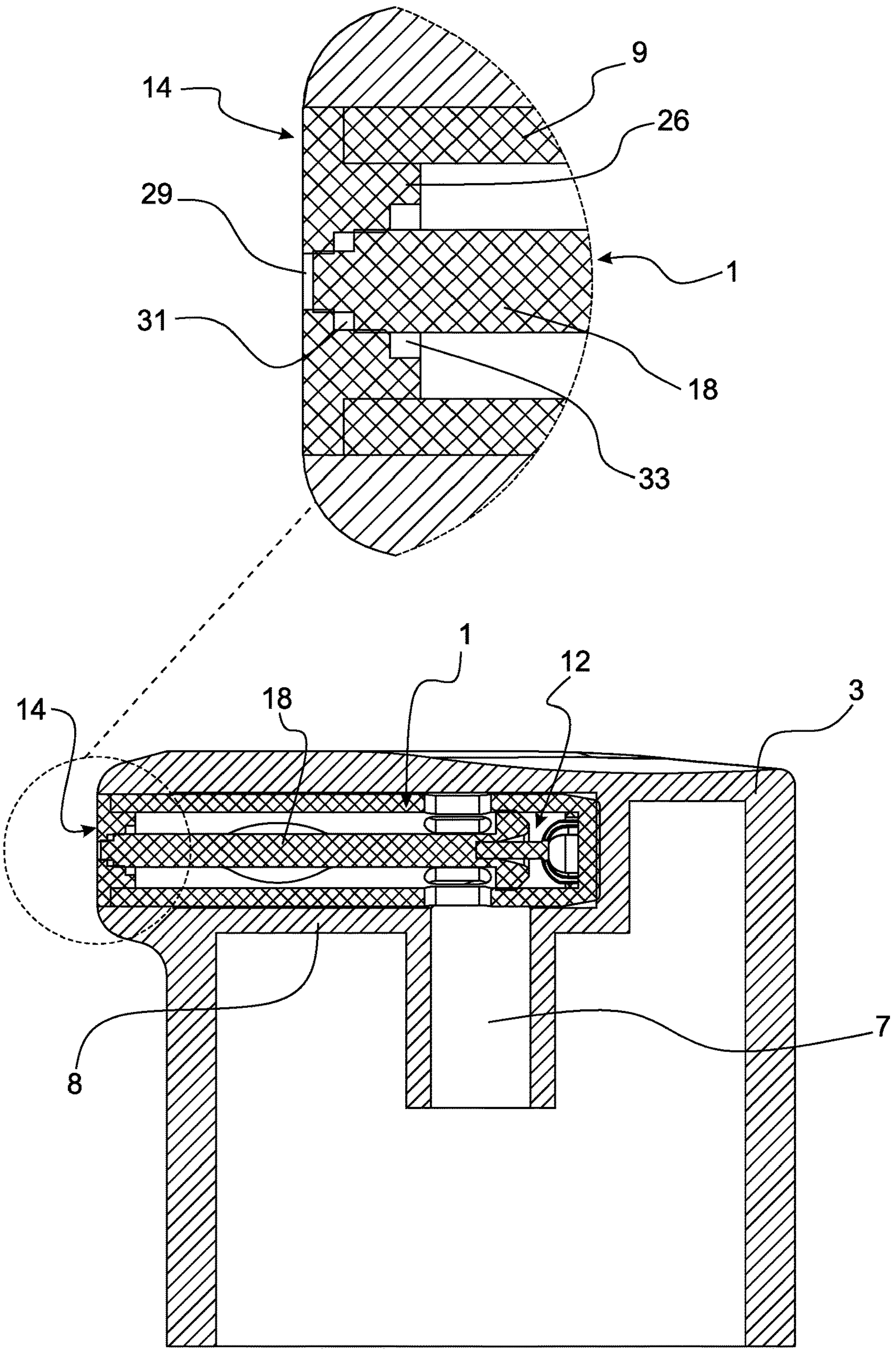
FIG. 6 is practically identical to FIG. 2, but this case illustrates another preferred embodiment to alter the outlet stream of the product.
Figure 7:
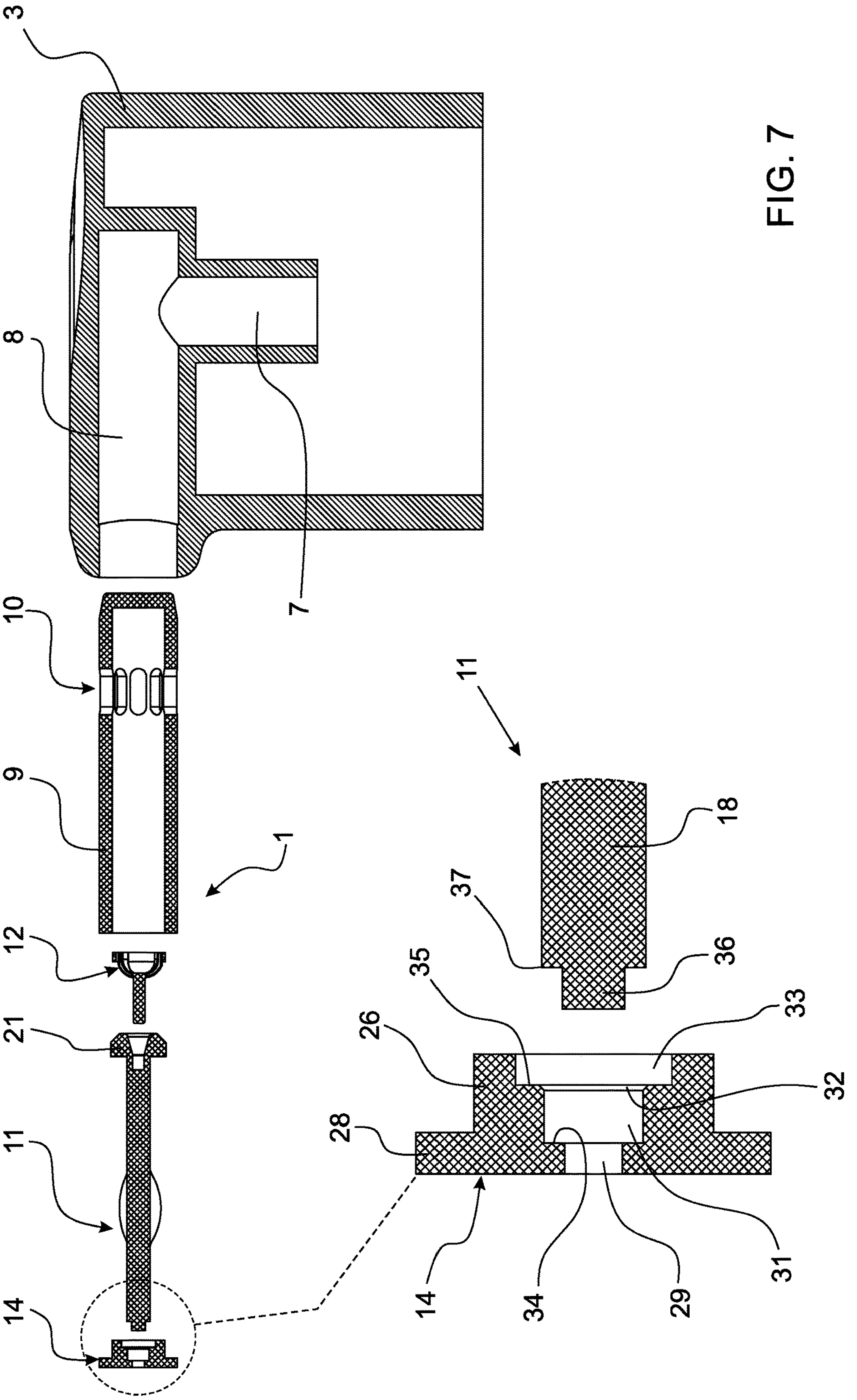
FIG. 7 is a blown-up view of FIG. 6, including an enlarged detail thereof.
Figure 8:
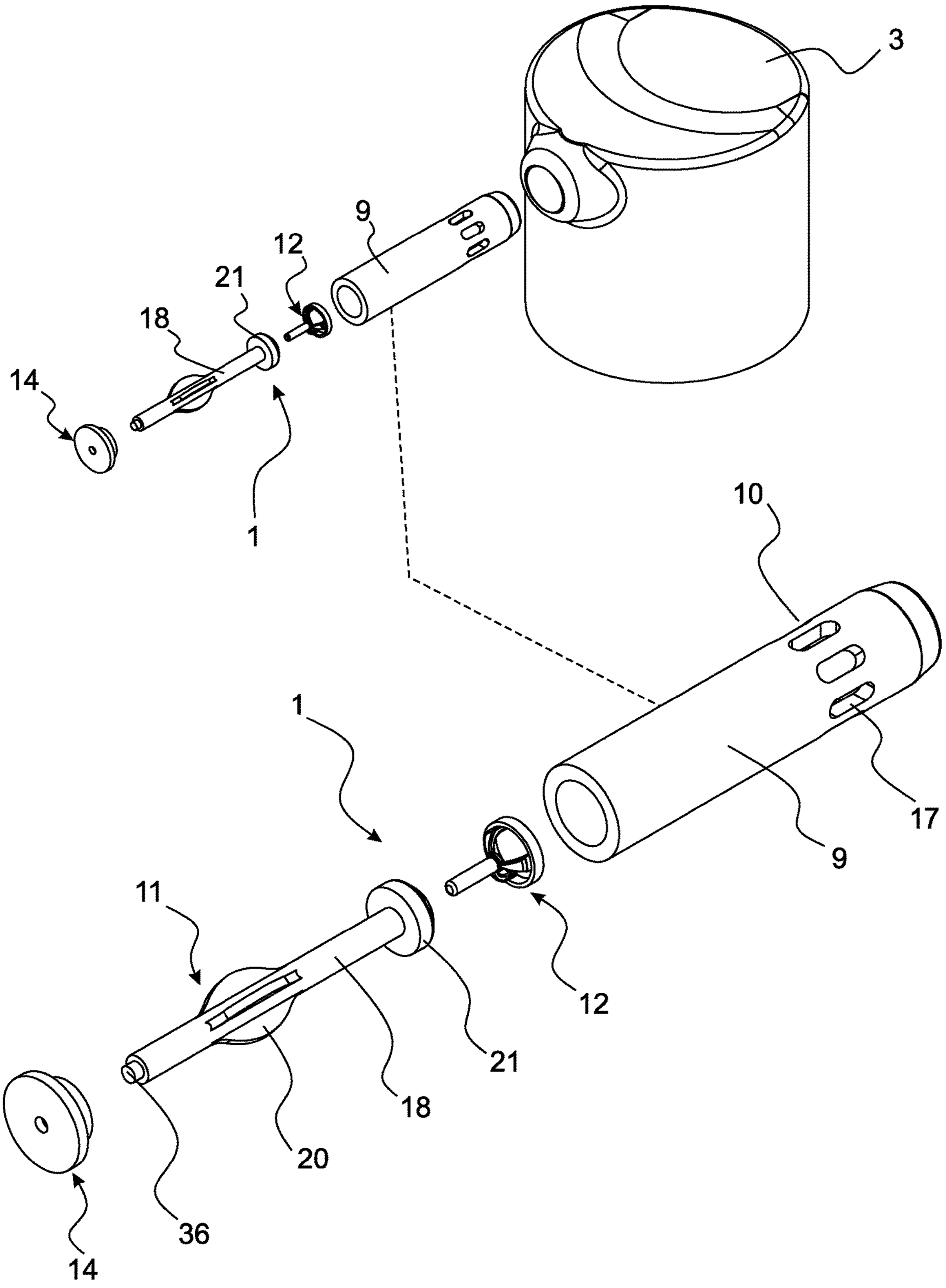
FIG. 8 shows a blown-up view and an enlarged detail thereof, showing in a front angle the other embodiment of FIGS. 6 and 7.
Figure 9:
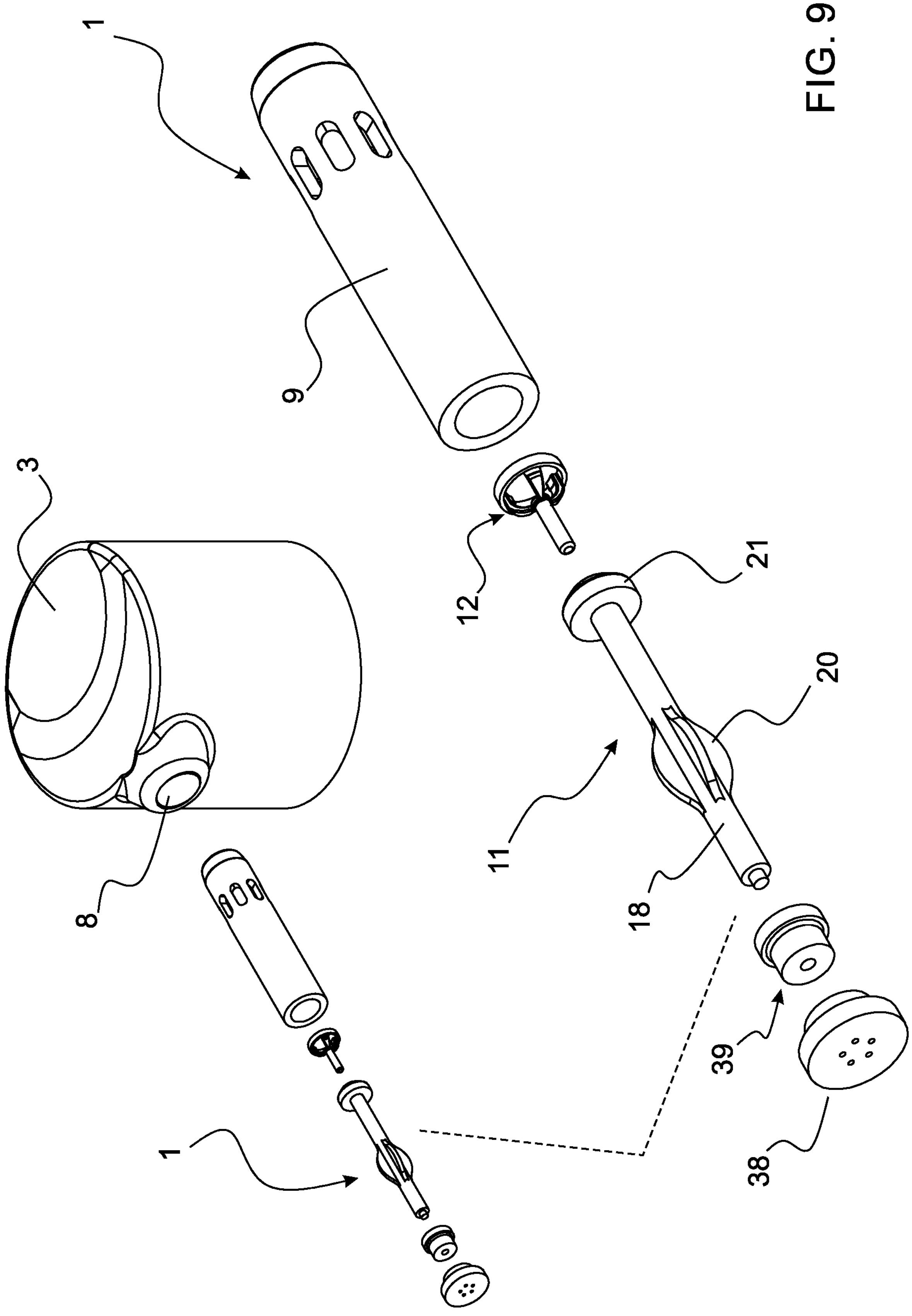
FIG. 9 represents a blown-up view in a front angle of the embodiment that turns the stream into spray.
Figure 10:
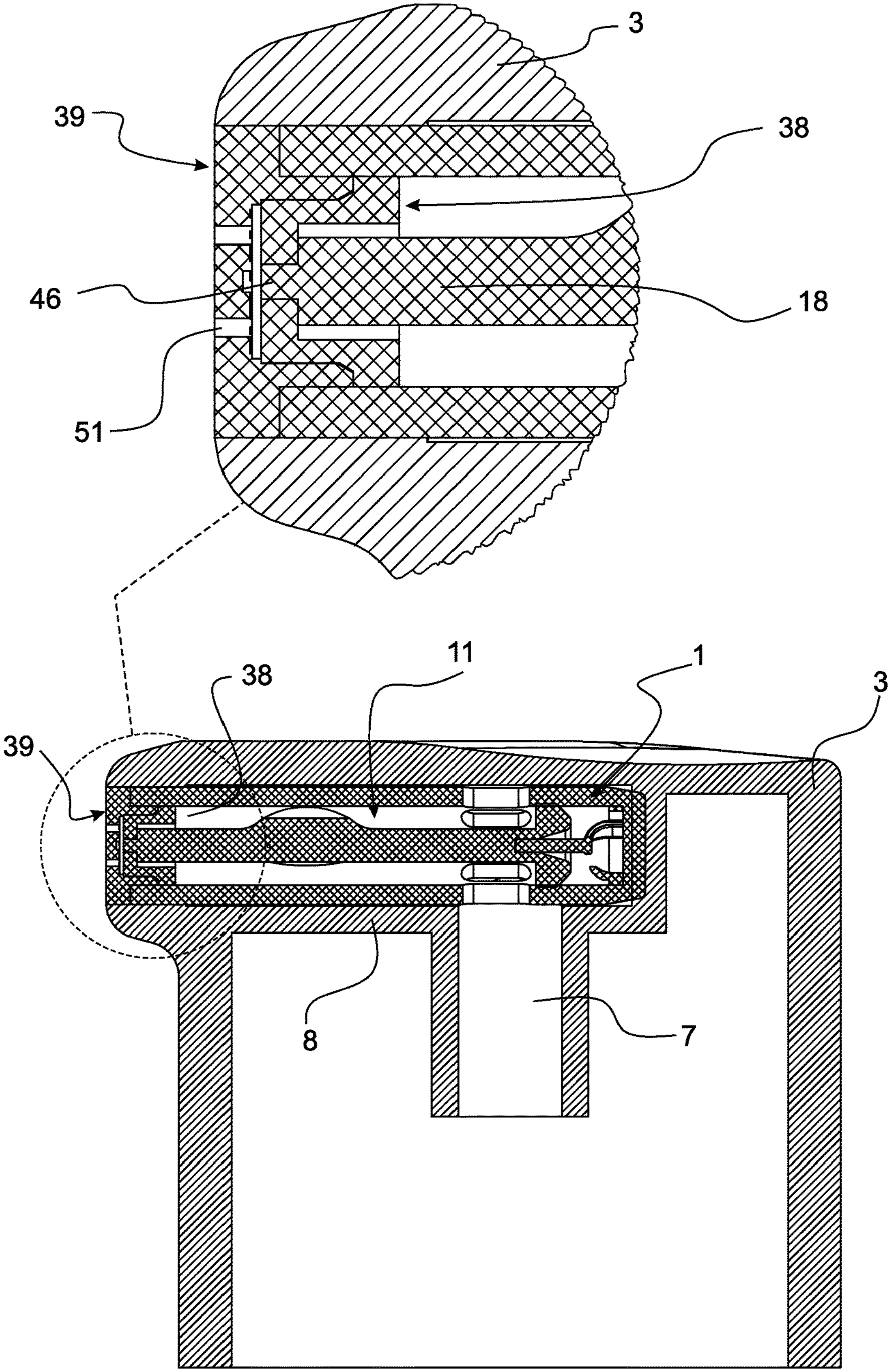
FIG. 10 shows a view identical to FIG. 2, but this case has modified details that define the version so that the stream can exit in spray form.
Figure 11:
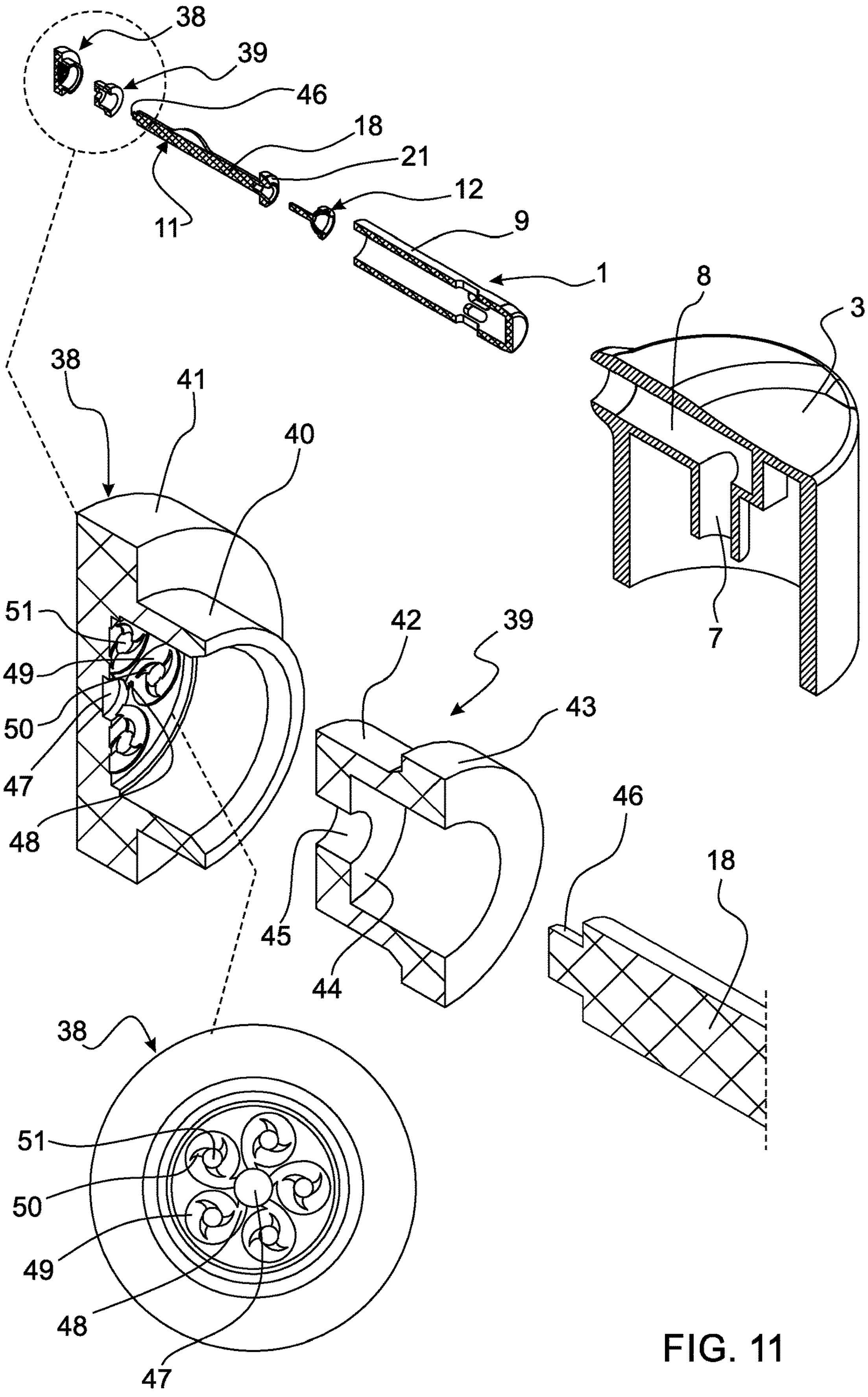
FIG. 11 represents an exploded perspective of the section illustrated in FIG. 10 and enlarged details thereof.
Figure 12:
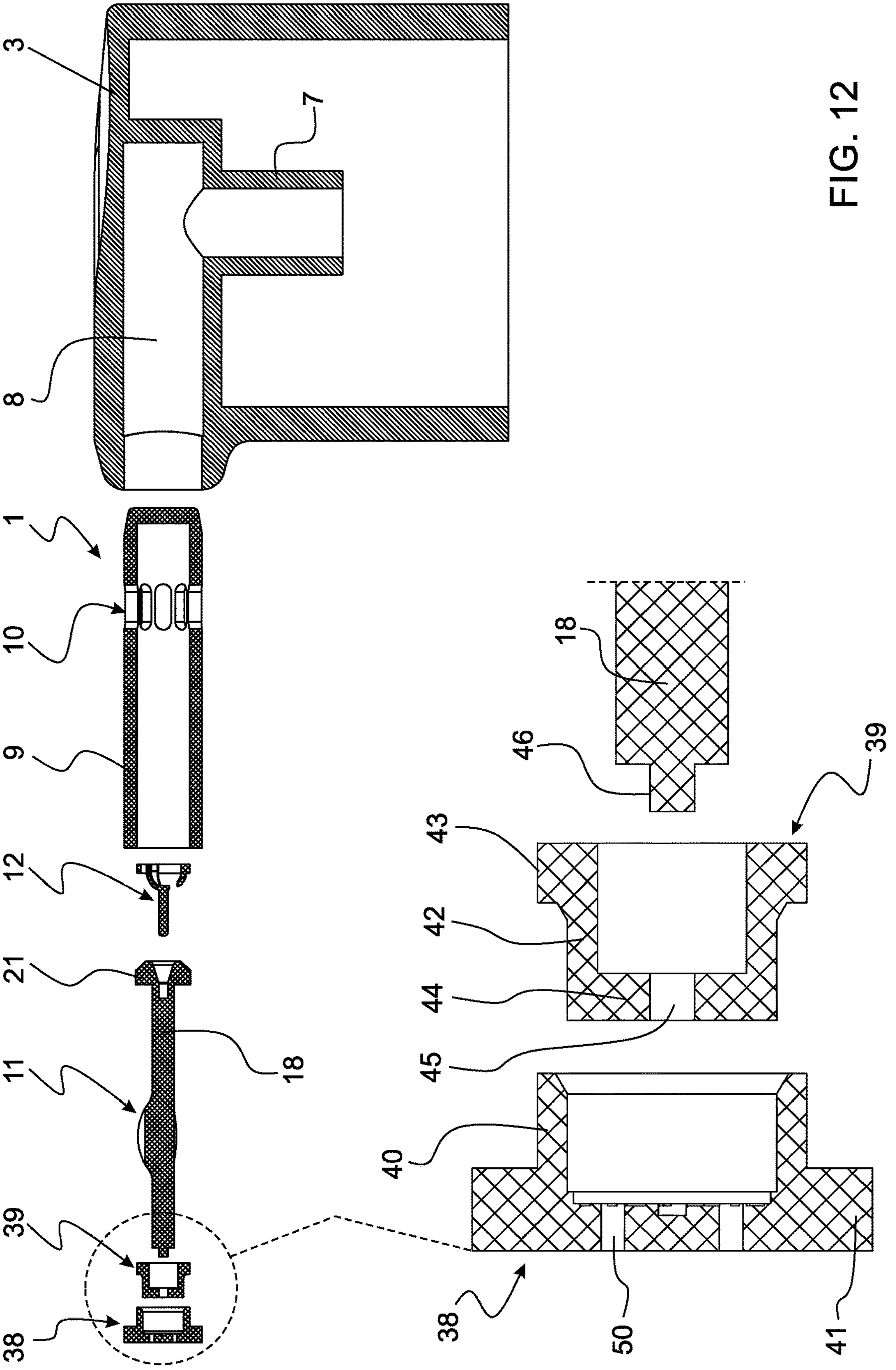
FIG. 12 shows a blown-up view of the section illustrated in FIG. 10 and an enlarged detail thereof.

In another preferred embodiment, illustrated in FIGS. 6, 7 and 8, constructive details are provided that enable the cartridge to dispense a quantity of product substantially larger than a drip, defined herein as trickle, such as occurs, for example, when the product is a lotion. In this case generally a greater quantity has to be dispensed in a single operation and, accordingly, the seat seal (14) is modified, but maintaining the rear ring part (26) with external diameter consistent for penetrating and being locked inside the tubular cartridge (9), having the same front flange (28) as penetration limit with external diameter equal to that of the tubular cartridge (9) and, further, this flange is hollowed by a central hole (29) which is characterized in that before it there are provided two circular widenings, an intermediary widening (31) with chamfer (32) and a rear widening (33) greater than the front, resulting in two degrees (34) and (35), which, jointly with the central hole (29), form the seat seal per se, which receives the corresponding end of the jet (11). This end, in turn, is also modified and ends in the form of an integrated stopper (36), with suitable diameter and length to close or open the central hole (29) and, before said integrated stopper (36), there is a degree (37) corresponding to the diameter of the cylindrical rod (18) which, in turn, closes or opens the intermediary widening (31), consequently, a closing in more than one stage occurs, such that a trickle of the product can be dispensed, such as occurs, for example, with a lotion.

In another preferred embodiment, illustrated in FIGS. 9 to 12, constructive details are provided that enable the cartridge to dispense a quantity of product in spray form and, accordingly, comprises a stream-splitting tip (38) and an internal seat seal (39). The stream-splitting tip (38) has a rear ring part (40) with external diameter consistent for penetrating and being locked inside the tubular cartridge (9), having a front blind flange (41) as penetration limit, with external diameter equal to that of the tubular cartridge (9), while in the internal diameter of the rear ring part (40) the internal seat seal (39) is incased which, in turn, has a circular stretch with a diameter corresponding (42) to the shape of a glass, with a rear flange (43) with external diameter to be adjusted in the internal diameter of the cartridge (9), and said internal seal (39) has its front part closed (44), containing a central hole (45) which form the seat seal per se, which receives the corresponding end of the cylindrical rod (18) of the jet (11) which ends in the form of an integrated stopper (46), with suitable diameter and length to close or open said central hole (45), establishing or interrupting a single stream which arrives at the stream-splitting tip (38), where said single stream is split into various other smaller streams and, accordingly, the inner side of the front blind flange (41) has a circular recess configuring a primary distribution chamber (47) between said front blind flange (41) and the seat seal formed by the central hole (45). Said primary chamber (47) has various radial outlets (48) to split the stream which tangentially communicate with other secondary distribution chambers (49), equally circular, distributed around the first (47), and each secondary distribution chamber (49) has internally spiral recesses (50) centrally with an outlet hole (51) of the product to be dispensed in spray.

The working of the embodiment illustrated in FIGS. 9 to 12 is practically identical to the preceding versions, but with alteration in the stream at the outlet of the tip, and this stream is split and swirled sufficiently for the product to be dispensed in the form of spray at each outlet hole (51), that is, in the same form as in the preceding versions, when there is an increase in pressure in the inlet duct (7) of the actuator (3), the spring (12) is overcome and the jet (11) is displaced backwards, through its plunger (21), consequently, the stopper (46) is moved away from the hole (45), where an outlet product stream is established which, in turn, fills the first chamber (47) of the stream-splitting tip (38). In this chamber the stream is split into other smaller streams through the radial exits (48), where each stream tangentially enters into the corresponding secondary distribution chamber (49) and, at this point, the spiral recesses (50) provoke swirling of the product stream, that is, the spiral recesses produce a particular effect in the product stream, spinning it with speed and pressure, consequently, said stream is further split, turning into a jet of particles which is finally dispensed in spray form through each outlet hole (51). This working condition enables the products with greater density, such as oils and the like, for example, the silicone can be dispensed in the desired form. Logically at the moment in which the pressure decreases and ceases in the inlet duct (7), the whole assembly returns to its previous position and thus the seat seal (39) is again closed in seal-tight manner.

Figure 13:
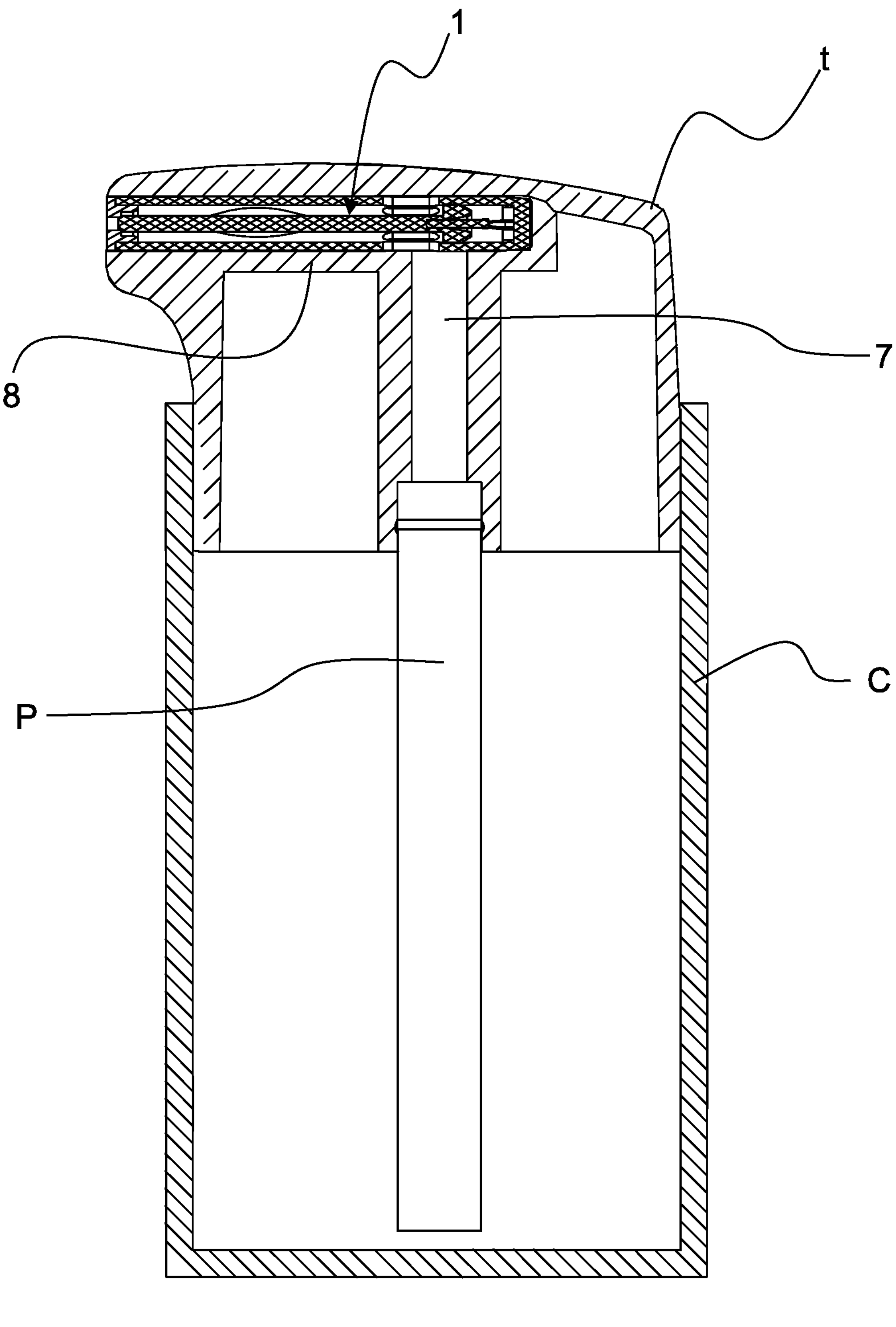
FIG. 13 represents a side view schematically showing a press-type packaging or without dispenser mechanism exemplifying that this type of packaging and other similar ones may utilize the present valve cartridge.

Lastly, FIG. 13 schematically shows a usual simple press-type packaging, those devoid of pump-type dispenser mechanism, that is, the internal pressure is obtained by pressing the body (C) of the packaging such that its content can be forced to flow through a suction tube (P) to a lid or similar (T). In this type of packaging, the suction tube (P) is provided when it remains or is handled upright, consequently, said suction tube is eliminated when the packaging remains or is handled capsizedly. Regardless of said aspects, said lid (T) is not an actuator and does not have any seal-tight component, that is, the stream ceases in the moment when the body of the packaging is no longer pressed. Therefore, said lid (T) is a fixed closing part that may potentially receive a seal-tight overcap (not illustrated), and in this case said lid (T) includes the inlet (7) and the outlet (8) ducts, in communication with each other, where the latter, such as already described, constitutes housing for the independent complementary valve mechanism (1) of the versions already described and configures the outlet nozzle (2). In this case exemplified in FIG. 1 the outlet duct (8) is illustrated in the horizontal position, but maintaining the same functional concept, same could be in slanted position or in the vertical position, which does not alter the working of the assembly, that is, by pressing the body (C) of the packaging, sufficient internal pressure is created so that the product can stream until it reaches the inside of the independent complementary valve mechanism (1). From this point onwards, the working of the assembly is exactly the same as described previously for all the embodiments.

The invention claimed is:

1. A valve cartridge for actuators of a range of packaging, said cartridge comprising an independent complementary valve mechanism mounted directly on an internal region of an outlet nozzle of said actuator, wherein said actuator is combined with a pump-type mechanism for extracting a semi-solid product contained in said packaging, wherein said cartridge has a flow dividing tip and an internal sealing seat, wherein said packaging has a seal-tight upper closing part that forms a body housing the pump-type mechanism, the upper closing part being in communication with the outlet nozzle, while a lower part of the packaging is in communication with an interior portion of the packaging, said lower part producing a vacuum, negative pressure or positive pressure, sufficient to move the semi-solid product to the outlet nozzle, containing an inlet duct and an outlet duct, and wherein the outlet duct is mounted in the independent complementary valve mechanism which alters said stream of the semi-solid product turning it into a drip, a trickle, or a spray, wherein the independent complementary valve mechanism comprises a tubular cartridge with diameter and length to be housed inside the outlet duct of the actuator, wherein said cartridge has an internal part that communicates with the inlet duct and receives the product stream to be altered and dispensed inside said cartridge having a mobile part longitudinally housed in jet form having a rear end supported on the tubular cartridge through a spring, while the opposite end is a jet or obturator tip kept pressed against a seat seal coupled to a front end of said cartridge and of the outlet nozzle, and wherein said jet or obturator tip moves away from said seat seal only when there is an increase in internal pressure in the ducts and, simultaneously, there is also a product stream inside the inlet duct and in the outlet duct so that a portion in drip form of said product is dispensed in the outlet nozzle; and wherein the jet has an elongated part in the form of cylindrical rod, wherein the front end has a chamfer and radial vanes, and wherein the rear end includes a plunger-like head, with a central hole for incasing the spring, and the plunger-like head and the radial vanes have outer diameters consistent for tightness and sliding inside the tubular cartridge.

2. The valve cartridge for actuators of a range of packaging according to claim 1, wherein the tubular cartridge has a frustoconical rear end which makes it easier to fit inside the outlet duct wherein the rear end includes a closing which internally constitutes support for the spring, and wherein said frustoconical tapering communicates with the inlet duct through a string of oblong apertures.

3. The valve cartridge for actuators of a range of packaging according to claim 1, wherein the spring comprises a cylindrical pin which, by the front end, is incased in said central hole of the plunger-like head, while the opposite end has radial projections curved backwards which configure small blade springs whose distal ends are interconnected by a stabilizer ring which constitutes support against a closing of the tubular cartridge.

4. The valve cartridge for actuators of a range of packaging according to claim 1, wherein the seat seal is formed by a rear ring part, with an internal chamfer and an external diameter consistent for penetrating and being locked inside the tubular cartridge, having a front flange as a penetration limit with the external diameter equal to that of the tubular cartridge and wherein the flange is hollowed by a central hole internally with a chamfer which constitutes the seat seal for the obturator tip of the jet.

5. The valve cartridge for actuators of a range of packaging according to claim 1, wherein the cartridge is enabled to dispense a quantity of product substantially larger than a drip, trickle, or spray when the product is a lotion; wherein the seat seal is modified, but maintains the rear ring part with an external diameter consistent for penetrating and being locked inside the tubular cartridge, having a front flange as a penetration limit with external diameter equal to that of the tubular cartridge, said flange being hollowed by central hole before which there are provided two circular widenings, including an intermediary widening with chamfer and a rear widening greater than the front, resulting in two degrees which, jointly with the central hole, form the seat seal, which receives the corresponding end of the jet, and is also modified and ends in the form of an integrated stopper, with a suitable diameter and length to close or open the central hole and, before said integrated stopper, there is a degree corresponding to the diameter of the cylindrical rod which closes or opens the intermediary widening, wherein a closing in more than one stage occurs.

6. The valve cartridge for actuators of a range of packaging according to claim 1, wherein the valve cartridge is enabled to dispense a quantity of product in the form of spray, said valve cartridge further comprising a stream-splitting tip and an internal seat seal, where a stream-splitting tip has a rear ring part with an external diameter consistent for penetrating and being locked inside the tubular cartridge, having a front blind flange as penetration limit with external diameter equal to that of the tubular cartridge, while in the internal diameter of the rear ring part the internal seat seal is incased and has a circular portion with a rear flange with an external diameter to be adjusted in the internal diameter of the cartridge, and said internal seal has its front part closed, containing a central hole that forms the seat seal, which receives the corresponding end of the cylindrical rod of the jet that ends in the form of an integrated stopper, having a suitable diameter and length to close or open said central hole, establishing or interrupting a single stream which arrives at the stream-splitting tip, where said single stream is split into various smaller streams and the inner side of the front blind flange has a circular recess configuring a primary distribution chamber between said front blind flange and the seat seal formed by the central hole; and wherein said primary chamber has multiple radial exits splitting the stream which tangentially communicate with other secondary distribution chambers, equally circular, distributed around the first, and also inside each secondary distribution chamber there are spiral recesses centrally with an outlet hole of the product to be dispensed in a spray.

7. The valve cartridge for actuators of a range of packaging according to claim 1, wherein said independent complementary valve mechanism is mounted directly on the internal closing region in the form of fixed lid with an outlet nozzle of a usual simple press-type packaging, and wherein internal pressure is obtained by pressing the body.

8. The valve cartridge for actuators of a range of packaging according to claim 1 wherein the independent complementary valve mechanism comprises a tubular cartridge with diameter and length to be housed inside the outlet duct of the actuator, and wherein the flow dividing tip has a rear annular part with an external diameter suitable for penetrating and being locked inside the tubular cartridge.

9. A valve cartridge for actuators of a range of packaging, said cartridge comprising an independent complementary valve mechanism mounted directly on an internal region of an outlet nozzle of said actuator, wherein said actuator is combined with a pump-type mechanism for extracting a semi-solid product contained in said packaging, wherein said cartridge has a flow dividing tip and an internal sealing seat, wherein said packaging has a seal-tight upper closing part that forms a body housing the pump-type mechanism, the upper closing part being in communication with the outlet nozzle, while a lower part of the packaging is in communication with an interior portion of the packaging, said lower part producing a vacuum, negative pressure or positive pressure, sufficient to move the semi-solid product to the outlet nozzle, containing an inlet duct and an outlet duct, and wherein the outlet duct is mounted in the independent complementary valve mechanism which alters said stream of the semi-solid product turning it into a drip, a trickle, or a spray, wherein the independent complementary valve mechanism comprises a tubular cartridge with diameter and length to be housed inside the outlet duct of the actuator, wherein said cartridge has an internal part that communicates with the inlet duct and receives the product stream to be altered and dispensed inside said cartridge having a mobile part longitudinally housed in jet form having a rear end supported on the tubular cartridge through a spring, while the opposite end is a jet or obturator tip kept pressed against a seat seal coupled to a front end of said cartridge and of the outlet nozzle, and wherein said jet or obturator tip moves away from said seat seal only when there is an increase in internal pressure in the ducts and, simultaneously, there is also a product stream inside the inlet duct and in the outlet duct so that a portion in drip form of said product is dispensed in the outlet nozzle, and wherein the spring comprises a cylindrical pin which, by the front end, is incased in said central hole of the plunger-like head, while the opposite end has radial projections curved backwards which configure small blade springs whose distal ends are interconnected by a stabilizer ring which constitutes support against a closing of the tubular cartridge.

10. A valve cartridge for actuators of a range of packaging, said cartridge comprising an independent complementary valve mechanism mounted directly on an internal region of an outlet nozzle of said actuator, wherein said actuator is combined with a pump-type mechanism for extracting a semi-solid product contained in said packaging, wherein said cartridge has a flow dividing tip and an internal sealing seat, wherein said packaging has a seal-tight upper closing part that forms a body housing the pump-type mechanism, the upper closing part being in communication with the outlet nozzle, while a lower part of the packaging is in communication with an interior portion of the packaging, said lower part producing a vacuum, negative pressure or positive pressure, sufficient to move the semi-solid product to the outlet nozzle, containing an inlet duct and an outlet duct, and wherein the outlet duct is mounted in the independent complementary valve mechanism which alters said stream of the semi-solid product turning it into a drip, a trickle, or a spray, wherein the independent complementary valve mechanism comprises a tubular cartridge with diameter and length to be housed inside the outlet duct of the actuator, wherein said cartridge has an internal part that communicates with the inlet duct and receives the product stream to be altered and dispensed inside said cartridge having a mobile part longitudinally housed in jet form having a rear end supported on the tubular cartridge through a spring, while the opposite end is a jet or obturator tip kept pressed against a seat seal coupled to a front end of said cartridge and of the outlet nozzle, and wherein said jet or obturator tip moves away from said seat seal only when there is an increase in internal pressure in the ducts and, simultaneously, there is also a product stream inside the inlet duct and in the outlet duct so that a portion in drip form of said product is dispensed in the outlet nozzle; and wherein the cartridge is enabled to dispense a quantity of product substantially larger than a drip, trickle, or spray when the product is a lotion; wherein the seat seal is modified, but maintains the rear ring part with an external diameter consistent for penetrating and being locked inside the tubular cartridge, having a front flange as a penetration limit with external diameter equal to that of the tubular cartridge, said flange being hollowed by central hole before which there are provided two circular widenings, including an intermediary widening with chamfer and a rear widening greater than the front, resulting in two degrees which, jointly with the central hole, form the seat seal, which receives the corresponding end of the jet, and is also modified and ends in the form of an integrated stopper, with a suitable diameter and length to close or open the central hole and, before said integrated stopper, there is a degree corresponding to the diameter of the cylindrical rod which closes or opens the intermediary widening, wherein a closing in more than one stage occurs.

11. A valve cartridge for actuators of a range of packaging, said cartridge comprising an independent complementary valve mechanism mounted directly on an internal region of an outlet nozzle of said actuator, wherein said actuator is combined with a pump-type mechanism for extracting a semi-solid product contained in said packaging, wherein said cartridge has a flow dividing tip and an internal sealing seat, wherein said packaging has a seal-tight upper closing part that forms a body housing the pump-type mechanism, the upper closing part being in communication with the outlet nozzle, while a lower part of the packaging is in communication with an interior portion of the packaging, said lower part producing a vacuum, negative pressure or positive pressure, sufficient to move the semi-solid product to the outlet nozzle, containing an inlet duct and an outlet duct, and wherein the outlet duct is mounted in the independent complementary valve mechanism which alters said stream of the semi-solid product turning it into a drip, a trickle, or a spray, wherein the independent complementary valve mechanism comprises a tubular cartridge with diameter and length to be housed inside the outlet duct of the actuator, wherein said cartridge has an internal part that communicates with the inlet duct and receives the product stream to be altered and dispensed inside said cartridge having a mobile part longitudinally housed in jet form having a rear end supported on the tubular cartridge through a spring, while the opposite end is a jet or obturator tip kept pressed against a seat seal coupled to a front end of said cartridge and of the outlet nozzle, and wherein said jet or obturator tip moves away from said seat seal only when there is an increase in internal pressure in the ducts and, simultaneously, there is also a product stream inside the inlet duct and in the outlet duct so that a portion in drip form of said product is dispensed in the outlet nozzle, and wherein the valve cartridge is enabled to dispense a quantity of product in the form of spray, said valve cartridge further comprising a stream-splitting tip and an internal seat seal, where a stream-splitting tip has a rear ring part with an external diameter consistent for penetrating and being locked inside the tubular cartridge, having a front blind flange as penetration limit with external diameter equal to that of the tubular cartridge, while in the internal diameter of the rear ring part the internal seat seal is incased and has a circular portion with a rear flange with an external diameter to be adjusted in the internal diameter of the cartridge, and said internal seal has its front part closed, containing a central hole that forms the seat seal, which receives the corresponding end of the cylindrical rod of the jet that ends in the form of an integrated stopper, having a suitable diameter and length to close or open said central hole, establishing or interrupting a single stream which arrives at the stream-splitting tip, where said single stream is split into various smaller streams and the inner side of the front blind flange has a circular recess configuring a primary distribution chamber between said front blind flange and the seat seal formed by the central hole; and wherein said primary chamber has multiple radial exits splitting the stream which tangentially communicate with other secondary distribution chambers, equally circular, distributed around the first, and also inside each secondary distribution chamber there are spiral recesses centrally with an outlet hole of the product to be dispensed in a spray.

* * * * *